March 30, 1948.  W. R. THEG  2,438,726
HAND TRUCK FOR HEAVY ARTICLES
Filed Aug. 21, 1945  2 Sheets-Sheet 1

INVENTOR
WILFRED RANDALL THEG
BY
his ATTORNEY

March 30, 1948.  W. R. THEG  2,438,726
HAND TRUCK FOR HEAVY ARTICLES
Filed Aug. 21, 1945  2 Sheets-Sheet 2
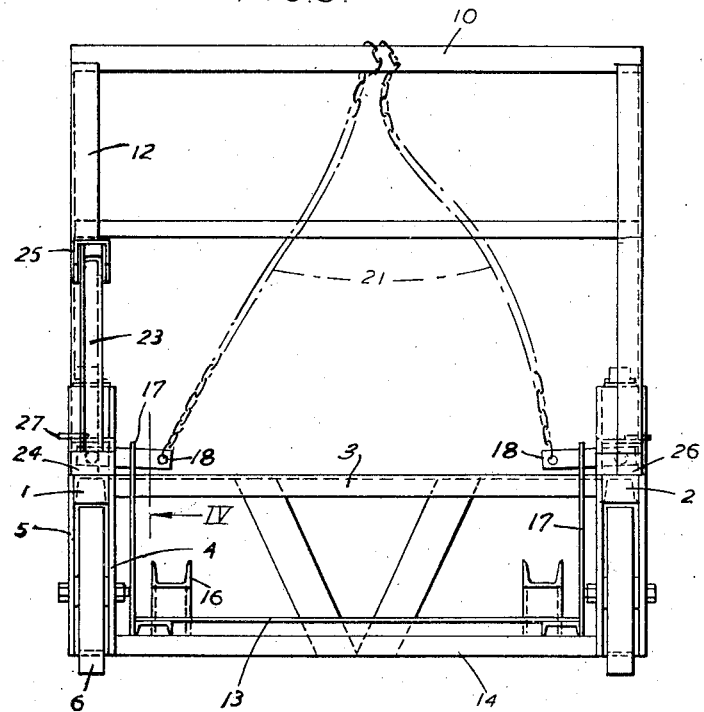
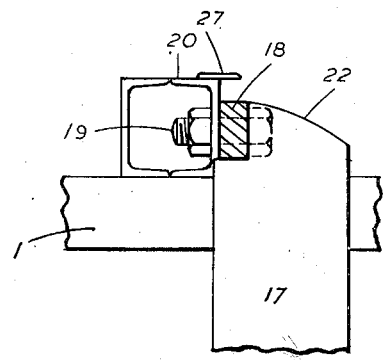
INVENTOR
WILFRED RANDALL THEG
BY
ATTORNEY Patented Mar. 30, 1948

2,438,726

UNITED STATES PATENT OFFICE 2,438,726

HAND TRUCK FOR HEAVY ARTICLES

Wilfred Randall Theg, Glasgow, Scotland

Application August 21, 1945, Serial No. 611,746
In Great Britain March 17, 1944

5 Claims. (Cl. 214—85)

This invention relates to a hand vehicle, in the nature of a low wheeled truck for removing heavy articles from one place to another; that is to say, articles which are too heavy to be removed conveniently or quickly by hand or to be lifted conveniently or quickly upon an ordinary hand truck for removal thereon.

An object of the present invention is to provide a hand vehicle which will be adapted to have a heavy article put upon it by workers, even of inferior strength, in a quick and simple manner, which will be movable from place to place as readily as the usual hand truck, and which will be adapted for unloading also in a quick and simple manner.

Another object is to provide a hand vehicle comprising a wheeled frame, a low level foot-controlled platform mounted in the frame to pivot about a cross axis between a normal or load-supporting position and a tipped position in which the platform inclines downwards and forwards to about ground level, and automatically locking but manually releasable means for holding the platform in the normal position.

Another object is to provide in a vehicle as aforesaid locking means comprising a hand releasable trigger device which, when the platform is returned from the tipped position to the normal position, at first rests idly upon a part on the platform and finally moves automatically into locking engagement with said part, remaining in such engagement until manually retracted.

Other objects of the invention will be apparent from the following specification and claims.

An example of a hand truck embodying the invention will now be described with reference to the accompanying drawings which illustrate the invention and in which—

Fig. 2 is a corresponding plan and Fig. 3 is a corresponding front end elevation.

Fig. 4 shows a constructional detail, being a section on the line IV of Figs. 2 and 3 drawn to a larger scale.

Figure 2:
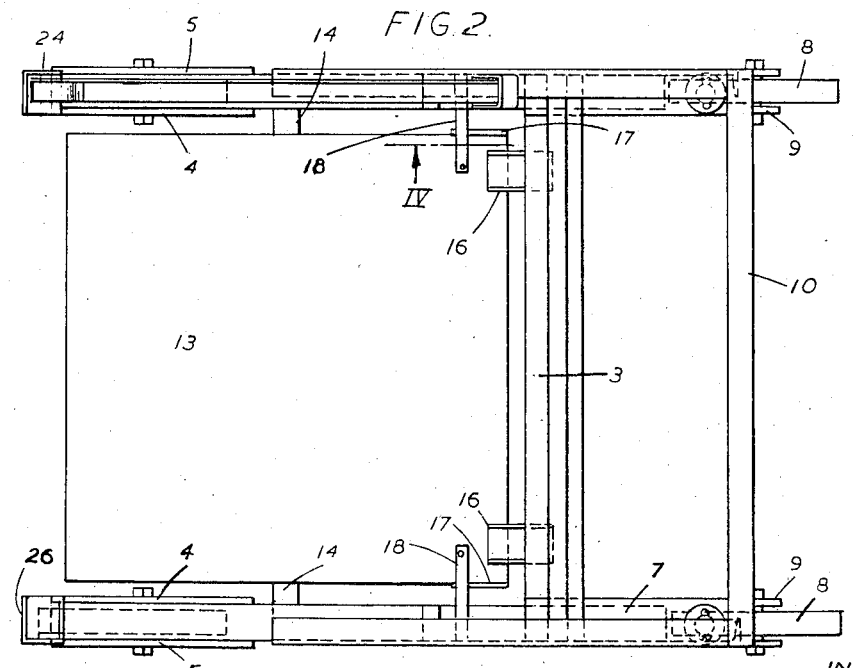

Referring to the drawings, the hand truck therein shown by way of example includes a wheeled frame 1, 2 and 3. The wheeled frame is open-fronted and open-bottomed, being forklike in plan (see Fig. 2). The sides 1 and 2 and the rear end 3 of the frame are of strong girder structure. The frame sides each include inner and outer front plates 4 and 5, and the two front wheels 6 are journalled each between two of these plates. The frame sides have rearwardly extending top brackets 7, two steering wheels 8 being journalled in castors 9 supported by said brackets. A cross-bar 10 constituting a hand rail, by means of which to push or pull the truck, is supported by uprights 11 on said brackets and inclined bars 12 extending from the side frames.

The low level platform is a simple plate 13 pivotally mounted in the open bottom of the frame on a cross axle 14 (or cross trunnions) extending into bearings 15 in the frame sides. The platform is so weighted and arranged that it tends to tip downwards at its front end to an extent which is limited by contact either with the ground or with stops 16 on the frame. The platform extends sufficiently rearwards to be depressible at its rear end by the foot of a worker holding the hand-rail constituted by the cross-bar 10.

On top of both side frames there are locking trigger devices which co-operate with short side posts 17 at the rear ends of the platform. Each trigger device comprises a pivotal latch 18 which is attached by a pivot bolt 19 to a bracket 20 on each of the side frames 1 and 2. Each latch is urged by its own weight to occupy a lowered position in which normally it engages a recess in the corresponding post as shown, and in this way holds the platform 13 against tipping from its normal horizontal setting. The trigger latches can be raised simultaneously by use of a chain 21 (Fig. 3 only) extending from the cross-bar 10 to each latch 18. When the latches are raised, they disengage themselves from the posts 17, with the result that the platform is free to tip. When the platform has to be returned from the tipped position, the trigger latches being then at rest in their raised positions upon camlike formations 22 on the posts, the posts slide from below said formations until, when the platform reaches its normal position, the latches drop into re-engagement with the recessed posts (see Fig. 4).

Figure 1:
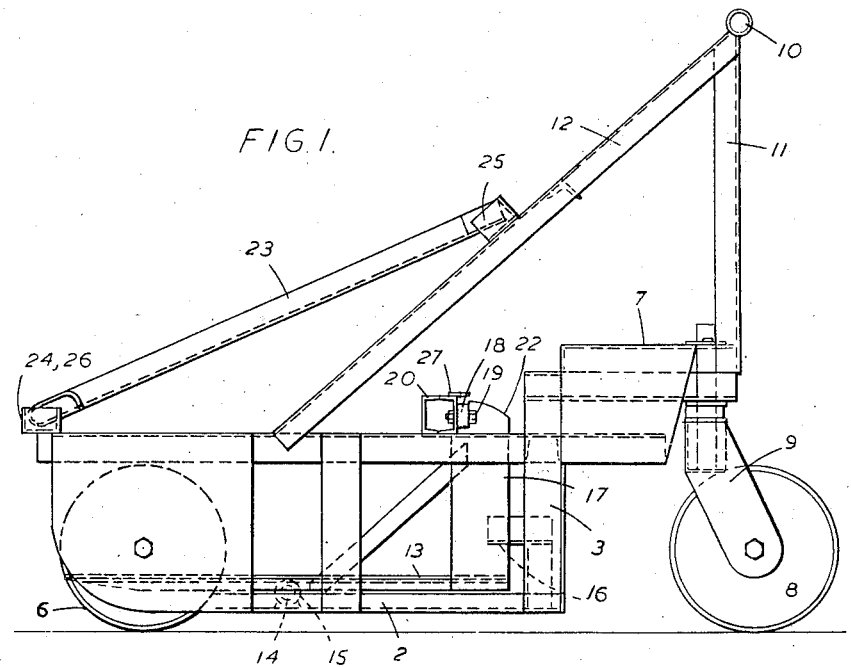
Fig. 1 is a side elevation of the hand truck.

A retaining bar 23 is rested at one end in a seat 24 on the top front corner of the side frame 1, being displaceable from an "out-of-use" position (Figs. 1, 2 and 3) against a seat 25 on the adjoining inclined bar 12 into an "in-use" position in which it crosses to the opposite side frame 2 and is securely located at its opposite end in a seat 26 on the top front corner of that frame. Such a retaining bar serves to prevent movement of the load from the truck by way of its open front end.

In the example, each of the pivotal-latch brackets 20 has an upper stop 27 which limits the upward angular movement of the associated latch 18.

In use of the truck, let us say for the removal of a heavy open-top loaded barrel (which must be maintained open-end upwards) from a first place to a second place, the procedure may be as follows:

The truck is steered to bring its front end close to the barrel say by a girl worker. The barrel is tilted slightly, by say a man or a boy according to its weight. The girl pushes the truck towards the barrel, pulling the trigger-latch chain 21 so as to let the platform 13 tip, and she manipulates the truck so that the platform enters below nearly all of the barrel's bottom end. Then the two workers, the girl pressing one foot on the rear of the platform, force the barrel upright so that the platform turning on its axle 14 finally reaches its horizontal position. There the locking devices 17 and 18 automatically inter-engage, thus holding the platform. The retaining bar 23 is swung across the front and brought into engagement with the seat 26. The truck in this way is loaded and the girl pushes it to the second place. There the retaining bar is swung back to its "out-of-use" position against the seat 25. The girl releases the locking devices by pulling the chain 21, meantime controlling the platform by foot pressure on the rear thereof, so that the barrel and platform tip or can be tipped until the platform reaches its limit position. The truck is withdrawn from below the barrel.

An advantage of a truck according to the invention is that it facilitates handling of heavy transportable goods by persons who need not use substantial strength in the work of loading the truck, moving it from place to place and unloading it. It will be manifest that the girl worker referred to is free to use one foot to control the up or down movement of the platform and also is enabled to release by hand the platform locking means, so that she controls the entire operations of loading and unloading the vehicle, leaving one or more other workers to devote themselves exclusively to the load.

I claim:

1. A hand truck for heavy articles comprising a wheeled frame including a hand frame by which the truck can be pushed and pulled by a worker, a low level platform mounted in said wheeled frame to pivot about a cross axis between a normal position and a tipped position in which the platform inclines downwards and forwards to about ground level, said platform extending rearwards so that it can be controllingly pressed upon by a foot of the worker holding said hand frame, locking means on said wheeled frame and platform for holding the platform in the normal position and control means for said locking means extending to said hand frame for operation there by a hand of said worker.

2. A hand truck for heavy articles comprising a wheeled frame, a low level platform mounted in said wheeled frame to pivot about a cross axis between a normal position and a tipped position in which the platform inclines downwards and forwards to about ground level, said platform extending rearwards so that it can be controllingly pressed upon by a foot of the worker holding said hand frame, a trigger device on the rear of said wheeled frame a part on the rear of said platform with which said trigger device cooperates to hold the platform in the normal position, and control means extending to said hand frame from said device for retraction thereof by a hand of said worker to free the platform for movement into the tipped position.

3. A hand truck for heavy articles as claimed by claim 1 in which the said locking means comprises a camlike part on the platform and a trigger device on said wheeled frame, said trigger device having a connection with said hand frame and said device being arranged to rest idly upon said part when said platform occupies its tipped position and to move automatically into locking engagement with said part and remain in such engagement until forcibly retracted through said connection.

4. A hand truck for heavy articles comprising a wheeled frame including a hand frame by which the truck can be pushed and pulled by a worker, a low level platform mounted in said wheeled frame to pivot about a cross axis between a normal position and a tipped position in which the platform inclines downwards and forwards to about ground level, said platform extending rearwards so that it can be controllingly pressed upon by a foot of the worker holding said hand frame, locking means including a part on said platform and a latch on said wheeled frame for engagement with said part, which has a camlike portion and a locking recess, said camlike portion serving to guide the latch into locking engagement with said recess on pivotal movement of the platform from its tipped position and said recess serving to lock the latch in the normal position of the platform, and control means extending from said latch to said hand frame for retraction of said latch from said locking recess by the hand of said worker.

5. A hand truck for heavy articles as claimed by claim 4 in which the locking part on the platform consists of an upright post with the camlike portion and locking recess at its top end and in which the latch is pivotally mounted on top of said frame to work at the level of said top end.

WILFRED RANDALL THEG.

REFERENCES CITED

The following references are of record in the file of this patent:

UNITED STATES PATENTS

| Number | Name | Date |
|---|---|---|
| 136,287 | Truesdell | Feb. 25, 1873 |
| 201,675 | Hollingsworth | Mar. 26, 1878 |
| 754,545 | Davis | Mar. 15, 1904 |
| 1,352,898 | Houck | Sept. 14, 1920 |
| 1,536,611 | Duke | May 5, 1925 |
| 1,856,787 | Schellentrager et al. | May 3, 1932 |